(12) United States Patent
Hutchinson et al.

(10) Patent No.: US 6,913,046 B2
(45) Date of Patent: Jul. 5, 2005

(54) FUEL DISPENSER SHEAR VALVE ASSEMBLY

(75) Inventors: Ray J. Hutchinson, Houma, LA (US); John S. McSpadden, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/279,781

(22) Filed: Oct. 24, 2002

(65) Prior Publication Data

US 2004/0079443 A1 Apr. 29, 2004

(51) Int. Cl.[7] .............................................. F16K 17/40
(52) U.S. Cl. .............................. 141/88; 141/1; 141/312; 137/68.15
(58) Field of Search .............................. 141/86, 88, 94, 141/311 A, 312, 1; 137/68.14, 68.15, 68.16, 312

(56) References Cited

U.S. PATENT DOCUMENTS

| | | | |
|---|---|---|---|
| 5,246,044 A | * | 9/1993 | Robertson et al. ............ 141/86 |
| 6,087,954 A | | 7/2000 | McSpadden et al. ... 340/825.19 |
| 6,089,284 A | | 7/2000 | Kaehler et al. ................ 141/94 |
| 6,182,679 B1 | * | 2/2001 | Pendleton ................ 137/68.14 |
| 6,575,206 B2 | * | 6/2003 | Struthers et al. .............. 141/94 |

* cited by examiner

Primary Examiner—Justine R. Yu
Assistant Examiner—Peter deVore
(74) Attorney, Agent, or Firm—Withrow & Terranova, PLLC

(57) ABSTRACT

A shear valve assembly for a fuel dispenser that ensures that the energy from an impact to the fuel dispenser causes a shear valve placed inline to the fuel supply conduit to engage if there is a possibility that such impact could cause the fuel supply conduit to break thereby causing a leak of fuel to the environment. The shear valve assembly may be constructed as part of the fuel dispenser during the manufacture of the fuel dispenser, or the shear valve assembly may be constructed separately from the fuel dispenser and attached to the fuel dispenser in the field during installation of a fuel dispenser.

46 Claims, 15 Drawing Sheets

FUEL DISPENSER SHEAR VALVE ASSEMBLY

FIELD OF THE INVENTION

The present invention relates to a fuel dispenser shear valve assembly that causes the energy from an impact to a fuel dispenser to be focused proximate to the shear valves.

BACKGROUND OF THE INVENTION

Fuel dispensers are located at service stations and are used by consumers to dispense fuel into vehicles. The fuel dispenser is comprised of a housing that contains internal hydraulic components designed to retrieve fuel from an underground fuel-piping network. The fuel is metered inside the fuel dispenser for an accurate accounting and billing process, and the fuel is delivered to a hose and nozzle combination to be dispensed into a vehicle fuel tank. Examples of fuel dispensers in service station environments are disclosed in U.S. Pat. Nos. 6,087,954 and 6,089,284.

The fuel delivered underneath the ground in the fuel-piping network is delivered to each fuel dispenser via a branch conduit. When a particular fuel dispenser is requested to dispense fuel by a user, a signal from the fuel dispenser causes a turbine pump coupled to an underground storage tank to draw fuel from the underground storage tank. The fuel is then delivered to a main fuel piping network throughout the service station. The fuel dispenser opens a valve in the bottom of fuel dispenser thereby fluidly coupling a branch fuel piping from the fuel dispenser to the main fuel-piping conduit to dispense fuel. The fuel then enters into the branch conduit and enters into the fuel dispenser's fuel supply conduit downstream where the fuel is metered and then delivered to the vehicle. The fuel dispenser contains a fuel supply conduit for each different type of fuel since fuel dispensers often are capable of dispensing different types of fuel. The fuel dispenser, if vapor recovery equipped, also contains a vapor recovery conduit that is coupled to the ullage area of the underground storage tank to return captured vapors from a vehicle to the underground storage tank.

Since the main fuel piping conduit is located beneath the ground, the fuel dispenser's fuel supply conduit must be connected to the branch conduit to fluidly couple the fuel dispenser's fuel supply conduit and branch conduit together. For safety concerns and to meet regulatory requirements, a shear valve is placed inline to the fuel supply conduit and branch conduit so that an impact to the fuel dispenser will cause the shear valve to engage thereby cutting off the fuel supply from the branch conduit to the fuel supply conduit inside the fuel dispenser. The shear valve shuts off the fuel supply from the branch conduit so that fuel does not leak in the service station environment when the impact to the fuel dispenser causes the branch conduit and/or fuel supply conduit in the fuel dispenser to be damaged.

However, shear valves that are used in fuel dispensers that exist today may not be installed properly such that they properly engage when an impact is made to a fuel dispenser. In order for the shear valve to properly engage when a fuel dispenser is impacted, the shear valve and fuel supply piping conduit must be installed according to standard guidelines. However, due to human error in combination with incorrect installations, shear valves often do not engage properly when a fuel dispenser is impacted. Often, the fuel supply conduit and/or branch conduit is damaged and/or broken before the shear valve engages, thereby causing the possibility of fuel to leak through the damaged and/or broken conduits into the environment. This is caused by either the energy from the impact to the fuel dispenser not properly being directed to the shear valve such that the shear valve always engages or due to incorrect installation.

Therefore, there exists a need to provide a reliable and consistent system to ensure that a shear valve in a fuel dispenser engages when an impact to a fuel dispenser. A need also exists to make sure this system is fault tolerant to installations performed outside of the control of the fuel dispenser manufacturer.

SUMMARY OF THE INVENTION

The present invention relates to a shear valve assembly for a fuel dispenser that ensures that the energy from an impact to the fuel dispenser causes a shear valve placed inline to the fuel supply conduit to engage if there is a possibility that such impact could cause the fuel supply conduit to break thereby causing a leak of fuel to the environment. The shear valve assembly may be constructed as part of the fuel dispenser during the manufacture of the fuel dispenser, or the shear valve assembly may be constructed separately from the fuel dispenser and attached to the fuel dispenser in the field during installation.

In one embodiment, the shear valve assembly is comprised of a set of parallel members. Each set of parallel members is connected to each other with substantially perpendicular support members. The support members connect to the fuel supply piping to provide a basis for energy transfer between an impact to the fuel dispenser and the shear valve assembly. The shear valves are provided as part of the shear valve assembly. One set of parallel members is located at or above the plane of the shear valves inline to the fuel piping, and another set of parallel members is located at or below the plane of the shear valves. The sets of parallel members are connected to each other using one or more shear fasteners that have a defined stress breaking point. The shear valve assembly also provides one or more anchor orifices that receive one or more anchor fasteners to secure the shear valve assembly to the ground and/or service station.

In another embodiment, the shear valve assembly is comprised of a set of substantially hollow structures. Support members connect from one side of the structure to the other. The support members connect to the fuel supply piping to provide a basis for energy transfer between an impact to the fuel dispenser and the shear valve assembly. Shear valves are provided as part of the shear valve assembly. One set of substantially hollow structures is located at or above the plane of the shear valves inline to the fuel piping, and another set of substantially hollow structures is located at or below the plane of the shear valves. The substantially hollow structures are connected to each other using one or more shear fasteners that have a defined stress breaking point. The shear valve assembly also provides one or more anchor orifices that receive one or more anchor fasteners to secure the shear valve assembly to the ground.

The shear valve assembly may be located above ground or located partially or wholly beneath the ground. The shear valve assembly may be connected to a footprint on the service station site during installation or connected directly to the ground. The shear valve assembly may be constructed as part of the fuel dispenser or constructed separate from the fuel dispenser and attached to the fuel dispenser during installation. In the case of the shear valve assembly being constructed separately from the fuel dispenser, conduits are provided on each side of the shear valves in the shear valve assembly to connect the shear valves to the fuel supply conduits and branch conduits during installation so that fuel supply will flow from the branch conduits to the fuel supply conduits inside the fuel dispenser.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Before turning to the particular aspects of the present invention, which starts at FIG. 7, prior art systems are first discussed below and are illustrated in FIGS. 1–6.

Figure 1:
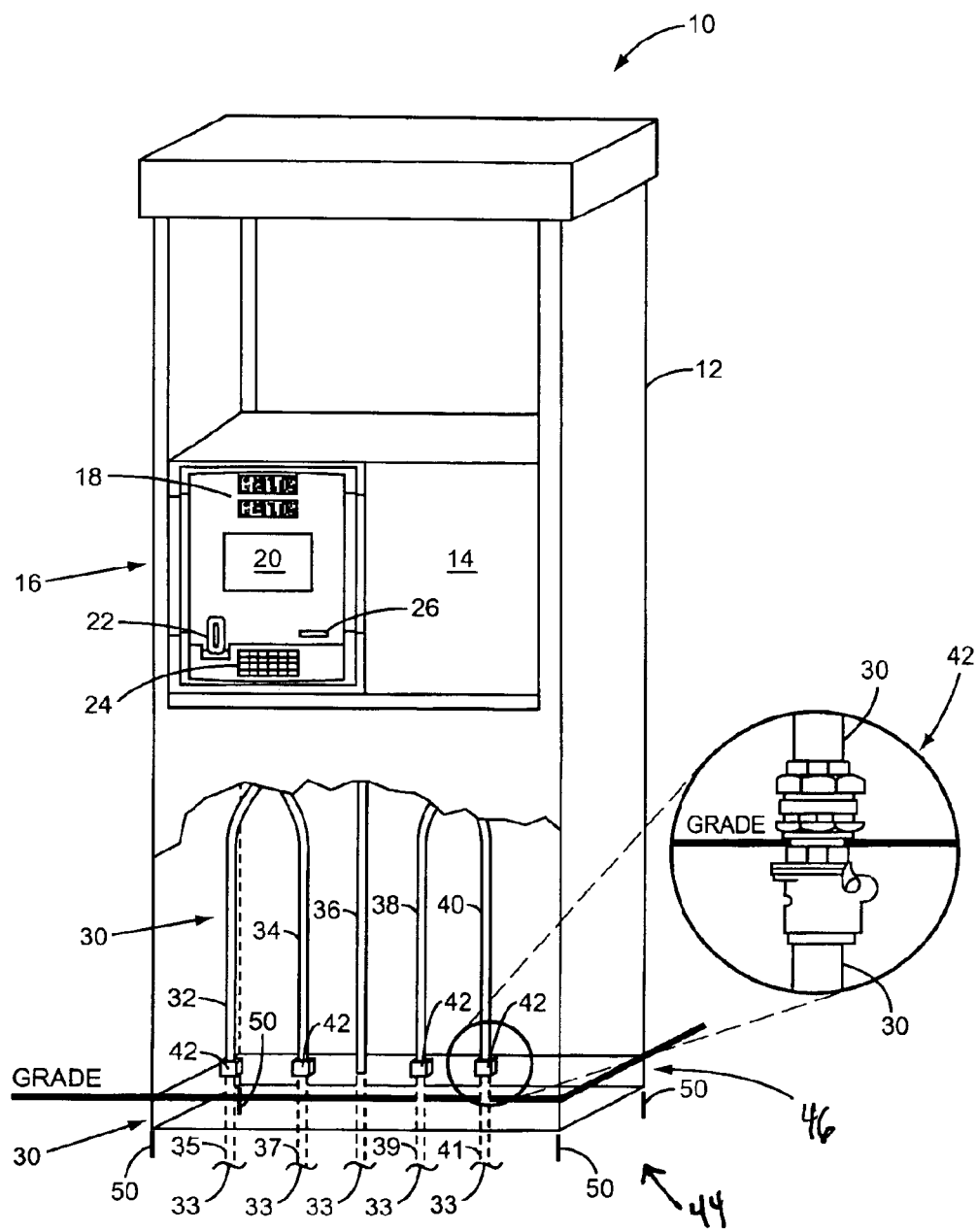
FIG. 1 illustrates one embodiment of a fuel dispenser and shear valve assembly in the prior art.

FIG. 1 illustrates a typical fuel dispenser in the prior art. A fuel dispenser 10 is provided and contains a housing 12. The fuel dispenser 10 contains internal components including a control system 14 that controls the various aspects of the fuel dispenser 10. A display 16 may be provided to provide information to a user of the fuel dispenser 10. A totals display 18 is provided that indicates the total amount of fuel dispensed and the total cost to the user. The fuel dispenser 10 may also contain an instruction display 20 that provides instructions and/or information to the user before, during, or after fuel is dispensed. The fuel dispenser 10 may also contain input devices including a card reader 22 for payment of fuel, a keypad 24 for entry of data, such as a PIN for a debit card, and a receipt printer 26 for printing a receipt of a fueling transaction. More information on fuel dispensers 10 can be found in U.S. Pat. Nos. 6,087,954 and 6,089,284, all of which are incorporated herein by reference in their entireties.

A fuel dispenser 10 contains fuel supply conduits (referred to generally as 30) that receive fuel from a fuel piping network. The fuel supply conduits 30 carry the fuel into the fuel dispenser 10 to be metered by a meter (not shown) and eventually delivered to a hose and nozzle (not shown) to be delivered to a vehicle. Typically, the fuel dispenser 10 has one fuel supply conduit 30 for each different type of fuel that can be dispensed. In FIG. 1, the fuel dispenser 10 is a blending fuel dispenser equipped with vapor recovery. A low octane fuel supply conduit 32 carries a low octane fuel from an underground storage tank containing a low octane gasoline. A high octane fuel supply conduit 34 carries a high octane fuel from an underground storage tank containing high octane fuel. Fuel supply conduits 32, 34 supply the low and high octane gasoline to the fuel dispenser 10 for one side of the fuel dispenser 10 since most fuel dispensers 10 are capable of dispensing fuel on two sides. Similarly, fuel supply conduits 38, 40 carry the low and high octane gasoline from the underground storage tank for the opposite side of the fuel dispenser 10. If the fuel dispenser 10 is equipped with vapor recovery, a vapor recovery return conduit 36 is provided that is common to both sides wherein vapor recovered during fueling is returned through the vapor recovery conduit 36 back to the ullage area of the underground storage tank (not shown).

The fuel supply conduits 30 are each coupled to a shear valve 42 that is placed at or near ground level of the fuel dispenser 10. On the opposite side of the shear valves 42 are branch conduits 35, 37, 39, 41 that receive fuel through the main conduit piping (not shown) from the underground storage tank. The fuel dispenser 10 is typically located on a footprint 44 placed in the service station environment before installation of the fuel dispenser 10. The footprint 44 may contain a substructure 46 that mates to the fuel dispenser 10 in order to connect the fuel dispenser 10 to the footprint 44. The footprint 44 may contain one or more anchor fasteners 50 that attach the substructure 46 firmly to the ground such that the fuel dispenser 10 as mated to the substructure 46 is firmly attached.

The only coupling between the fuel dispenser 10 and the shear valves 42 is via the fuel supply conduits 30. When an impact occurs on the fuel dispenser 10, the only method of energy transfer between the fuel dispenser 10 and the shear valves 42 is via the fuel supply conduits 30. Depending on the impact, the energy from the impact to the fuel dispenser 10 may cause a break in one of the fuel supply conduits 30 or the branch conduits 35, 37, 39, 41 before the shear valves 42 engage. This may result in one of the fuel supply conduits 30 or branch conduits 35, 37, 39, 41 leaking fuel after an impact is made to the fuel dispenser 10 since the energy transfer method between the fuel dispenser 10 and the shear valves 42 may not be sufficient to cause the shear valves 42 to engage first. A major problem exists with this design in that there is no structure or method that efficiently transfers the energy directed from all possible impact points of the fuel dispenser 10 to the shear valves 42.

Figure 2:
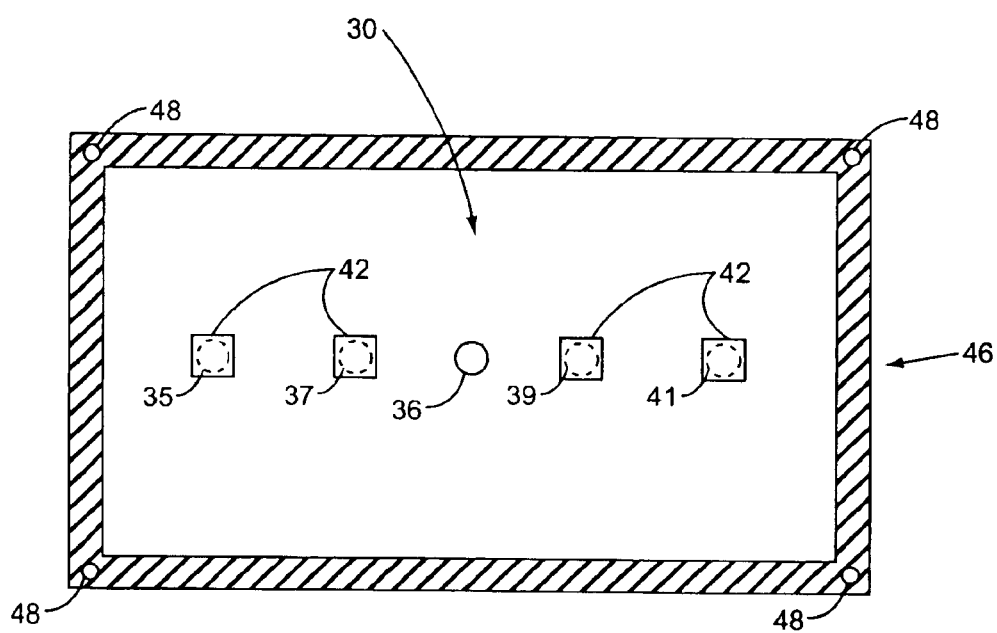
FIG. 2 illustrates a top view of FIG. 1.

FIG. 2 is a top view of the substructure 46 illustrated in FIG. 1 for clarity purposes. Note that the substructure 46 contains anchor fastener orifices 48 in which the anchor fasteners 50 insert and attach the substructure 46 securely to the ground. The substructure 46 is separate from the fuel dispenser housing 12 and is not part of the fuel dispenser 10 until installation. Fuel dispenser manufacturers do not manufacture the substructure 46. FIG. 2 also shows the branch conduits 35, 37, 39, 41 extending downward below the shear valves 42.

Figure 3:
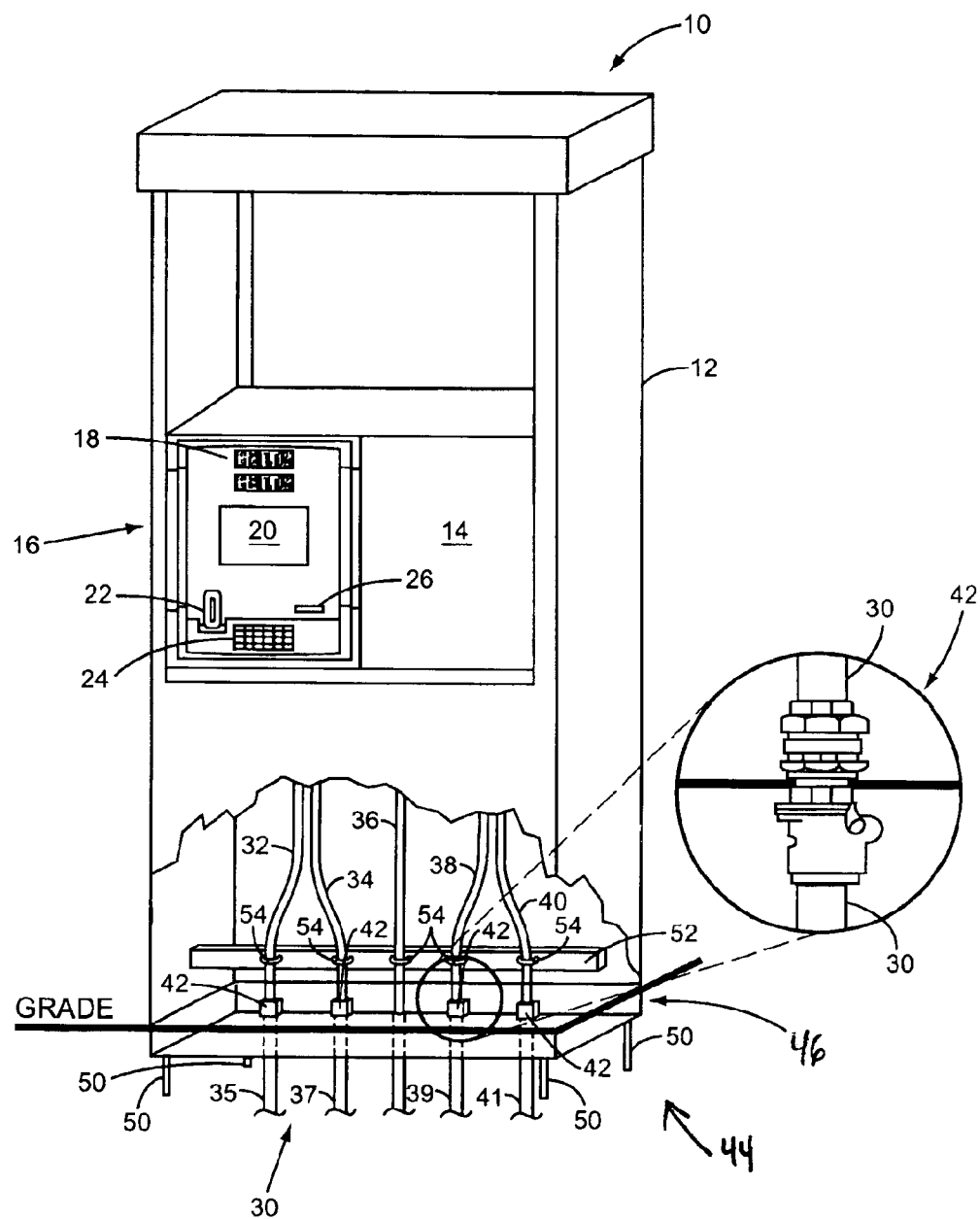
FIG. 3 illustrates another embodiment of a fuel dispenser and shear valve assembly in the prior art.

FIG. 3 is another illustration of a fuel dispenser 10 in the prior art that is similar to FIG. 1. However, in FIG. 3 a horizontal support member 52 is included. The horizontal support member 52 runs from the left side to the right side of the inside of the fuel dispenser 10 and is centered in the fuel dispenser 10 attaching to the inner walls of the fuel dispenser housing 12. The fuel supply conduits 30 and the vapor return conduit 36 are attached to the horizontal support member 52 via U-bolts 54. This configuration provides a better coupling between the fuel dispenser housing 12 proximate to the shear valves 42 since an impact to the housing 12 will channel energy into the horizontal support member 52, which is in turn connected to the fuel supply conduits 30 via U-bolts 54, which are in turn connected to the shear valves 42. However, there is still not an efficient energy transfer proximate to the shear valve 42 when an impact is made to the housing 12. Also, the success of this design depends largely upon how the shear valves 42 are installed between the branch conduits 35, 37, 39, 41 and the fuel supply conduits 32, 34, 36, 40 which is typically performed in the field by individual technicians and out of the control of the fuel dispenser manufacturer thereby leading to differences in installations.

Figure 4:
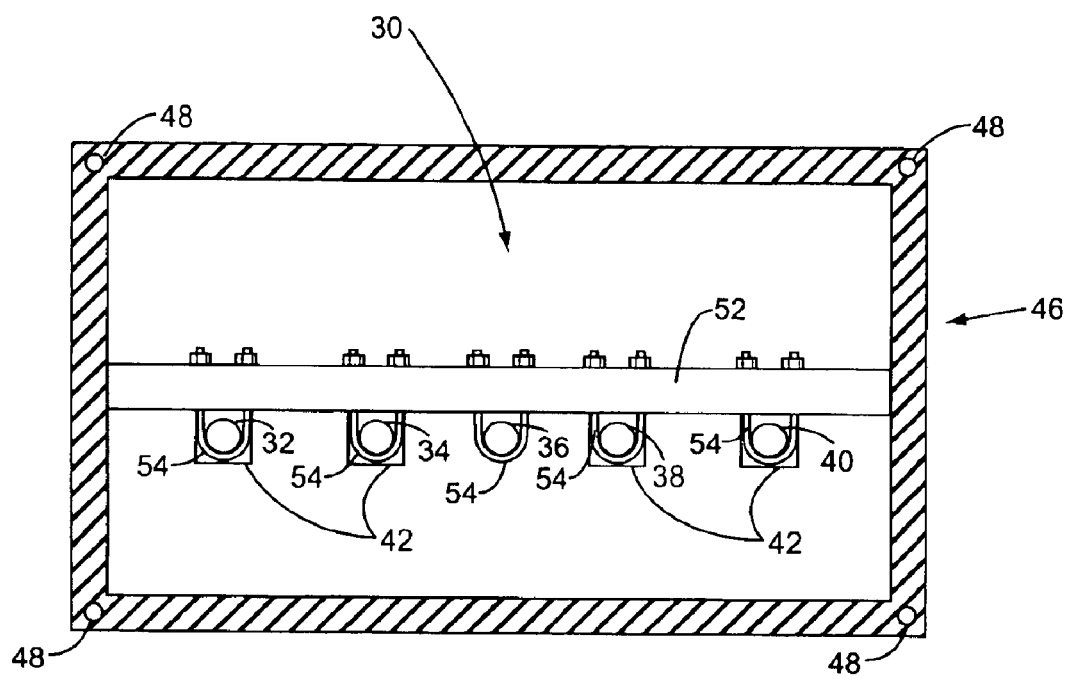
FIG. 4 illustrates a top view of FIG. 3.

FIG. 4 is a top view of the substructure 46 and horizontal support member 52 illustrated in FIG. 3 for clarity purposes. Note that the substructure 46 contains anchor fastener orifices 48 in which the anchor fasteners 50 insert and attach the substructure 46 securely to the ground. The substructure 46 is separate from the fuel dispenser housing 12 and is not part of the fuel dispenser 10 until installation. Fuel dispenser manufacturers do not manufacture the substructure 46. FIG. 4 also shows the branch conduits 35, 37, 39, 41 extending downward below the shear valves 42.

Figure 5:
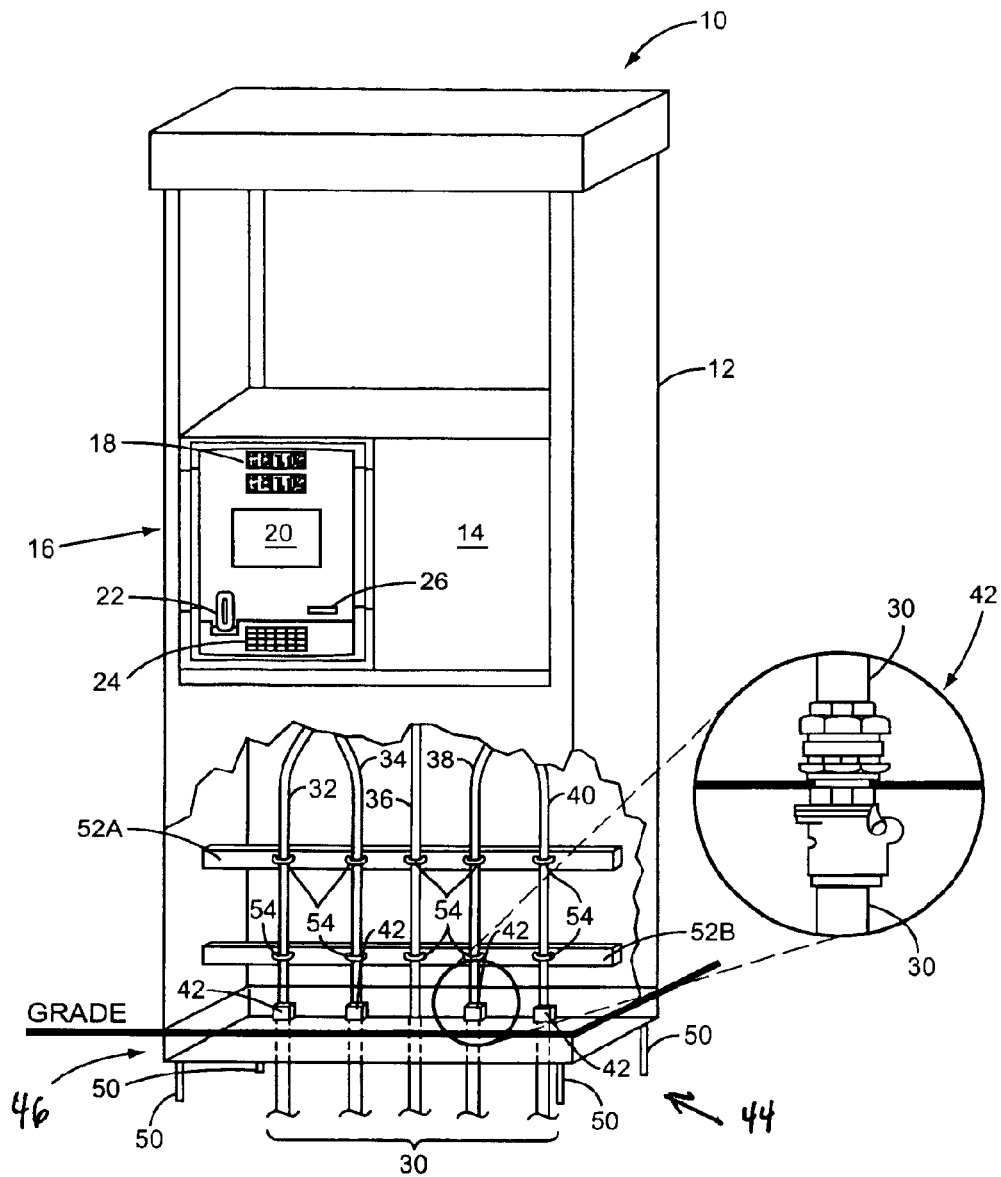
FIG. 5 illustrates another embodiment of a fuel dispenser and shear valve assembly in the prior art.

FIG. 5 is another illustration of a fuel dispenser 10 in the prior art that is similar to FIG. 3. However in FIG. 5, two horizontal support members 52A, 52B are included. The horizontal support members 52A, 52B run from the left side to the right side of the inside of the fuel dispenser 10 and attach to the inner walls of the fuel dispenser housing 12. The fuel supply conduits 30 and the vapor return conduit 36 are attached to the horizontal support members 52A, 52B via U-bolts 54. This configuration provides a better coupling between the fuel dispenser housing 12 proximate to the shear valves 42 since an impact to the housing 12 will channel energy into the horizontal support members 52A, 52B, which are in turn connected to the fuel supply conduits 30 via U-bolts 54, which are in turn connected to the shear valves 42. In this embodiment, an impact to the housing 12 at higher locations will cause more efficient energy transfer to the shear valve 42 than the embodiment illustrated in FIG. 3 since one of the horizontal support members 52A is located at a higher location inside the fuel dispenser 10. However, there is still a possibility that energy from an impact to the housing will not efficiently transfer proximate to the shear valve 42.

Figure 6:
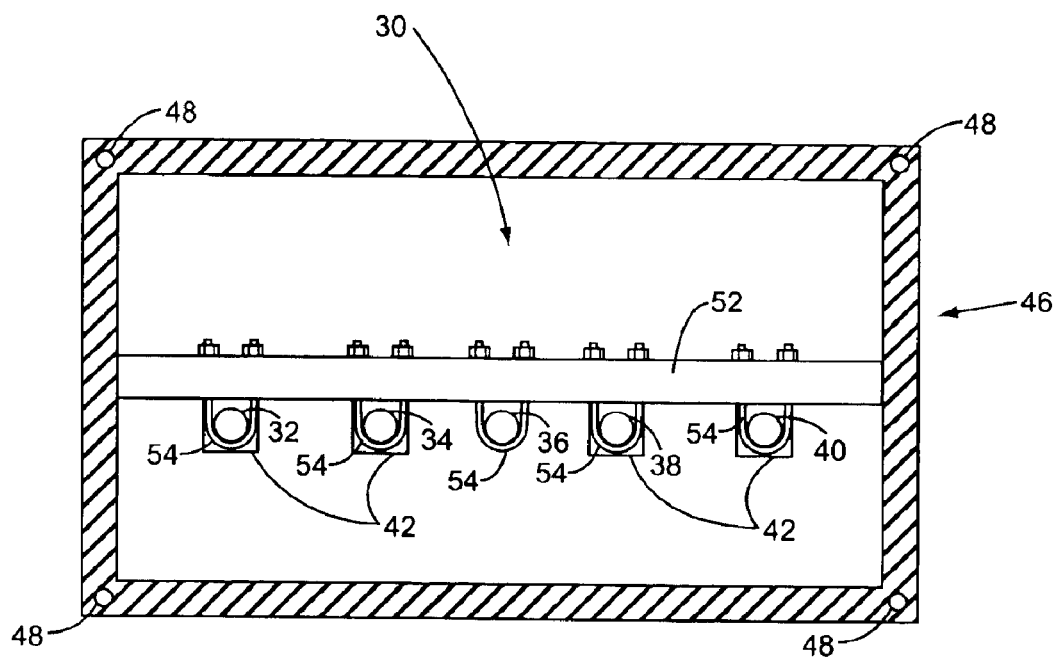
FIG. 6 illustrates a top view of FIG. 5.

FIG. 6 is a top view of the substructure 46 and horizontal support members 52A, 52B illustrated in FIG. 5 for clarity purposes. Note that the substructure 46 contains anchor fastener orifices 48 in which the anchor fasteners 50 insert and attach the substructure 46 securely to the ground. The substructure 46 is separate from the fuel dispenser housing 12 and is not part of the fuel dispenser 10 until installation. Fuel dispenser manufacturers do not manufacture the substructure 46. FIG. 6 also shows the branch conduits 35, 37, 39, 41 extending downward below the shear valves 42.

Figure 7:
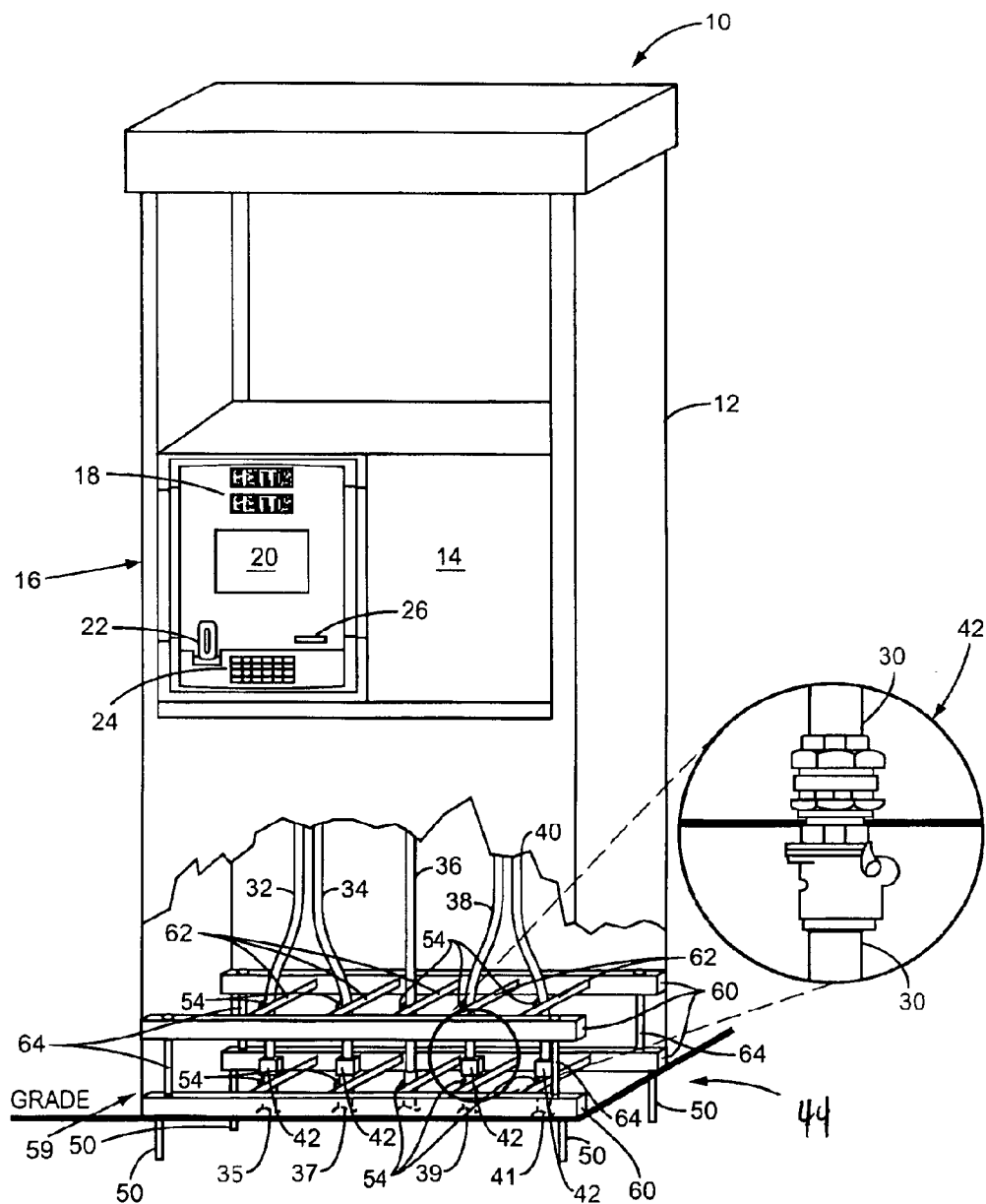
FIG. 7 illustrates a fuel dispenser and shear valve assembly according to one embodiment of the present invention.

FIG. 7 illustrates one embodiment of a shear valve assembly according to the present invention. As part of the fuel dispenser 10, a shear valve assembly 59 is provided. The shear valve assembly 59 is comprised of two parallel members 60 that are placed on each side of the fuel dispenser 10 and are attached to the fuel dispenser housing 12 for a total of four parallel members 60. Two of the parallel members 60 are attached on opposite sides from each other on a plane above the location of the shear valves 42, and the other two parallel support members 60 are located directly beneath the upper parallel members 60 in a plane below or at the location of the shear valves 42. The upper parallel member 60 and the parallel member directly beneath it are attached to each other using a shear fastener 64. The fuel supply conduits 32, 34, 38, 40 and the vapor recovery conduit 36 are coupled to cross members 62 that run in a perpendicular direction to the parallel members 60. U-bolts 54 secure the fuel supply conduits 32, 34, 38, 40 and the vapor recovery conduit 36 to the cross members 62. The shear valves 42 are provided as part of the shear valve assembly 59.

When an impact is made to the housing 12, energy will transfer from the housing 12 to the parallel members 60 which are located proximate to the shear valves 42. The shear fasteners 64 that connect the parallel members 60 together are designed to have a breaking stress point such that the energy from an impact to the housing 12 directed to the parallel members 60 will cause the shear fastener 64 to break before or at the same time any damage can occur to the fuel supply conduits 30 so that the fuel supply is disconnected from the branch conduits 35, 37, 39, 41 to prevent a leak from occurring. A break of the shear fasteners 64 will cause the shear valves 42 to engage since the fuel supply conduits 32, 34, 38, 40 which are attached to the parallel members 60 are also attached to the shear valves 42.

The shear fastener 64 may be any type of fastener that is capable of connecting the two parallel members 60 together, including but not limited to a screw, bolt, rod, shaft, conduit, pipe, or other fastener. The shear fastener 64 should be selected that has a breaking point when a defined amount of force is applied to the shear fastener 64.

Figure 8:
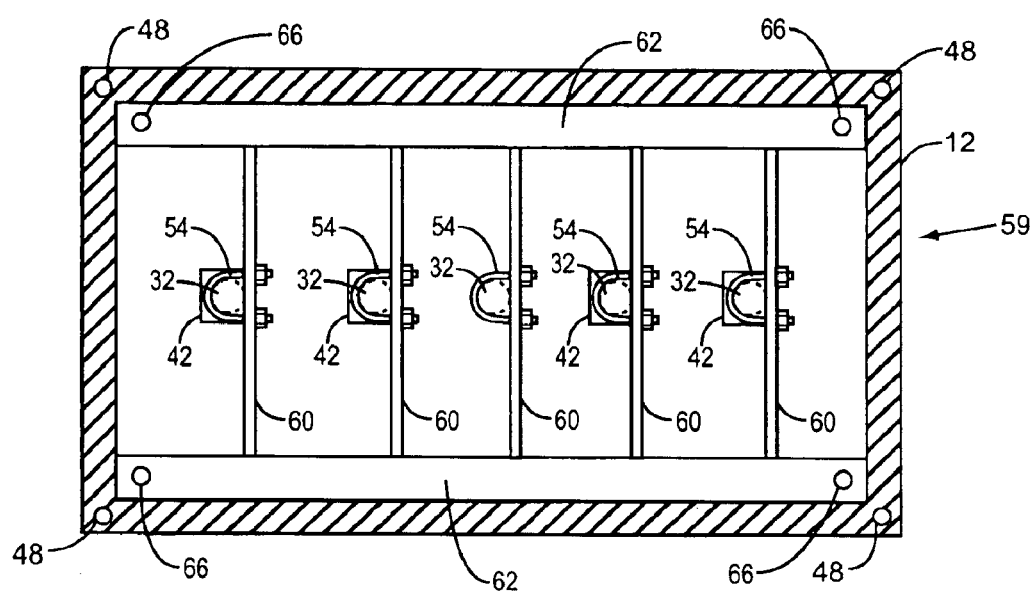
FIG. 8 illustrates a top view of FIG. 7.

FIG. 8 is a top view of the shear valve assembly 59, shear fastener orifices 66 are placed in the parallel members 60 so that the shear fasteners 66 can be inserted to connect the parallel members 60 together as previously discussed. The fuel dispenser 10 is connected to the footprint 44 and/or ground using anchor fasteners 50 that are inserted through the anchor fastener orifices 48. However, the anchor fastener orifices 48 are part of the shear valve assembly 59, which is part of the overall fuel dispenser 10. In this manner, the shear valve assembly can be manufactured by the fuel dispenser manufacturer so that quality and consistency is maintained for performance purposes.

The shear valve assembly 59 may be integrated as part of the fuel dispenser 10 in the manufacturing process, or may be constructed as a separate assembly and mated to the fuel dispenser 10 during manufacturing or out in the field. If the shear valve assembly 59 is part of the fuel dispenser 10 during manufacture, the fuel supply conduits 30 are connected to shear valves 42 during manufacture, and a conduit (not shown) may be provided beneath the shear valve 42 to connect to the branch conduits 35, 37, 39, 41 in the field during installation of the fuel dispenser 10. If the shear valve assembly 59 is not part of the fuel dispenser 10 during manufacture, a conduit (not shown) may be provided above and below the shear valves 42 to connect to the fuel supply conduits 30 and the branch conduits 35, 37, 39, 41 to the shear valve assembly 59 during installation of the fuel dispenser 10. In either case, the shear valve assembly 59 and the shear fasteners 64 have been chosen and constructed before installation of the fuel dispenser 10 in the field so that quality and consistency in performance is achieved.

Figure 9:
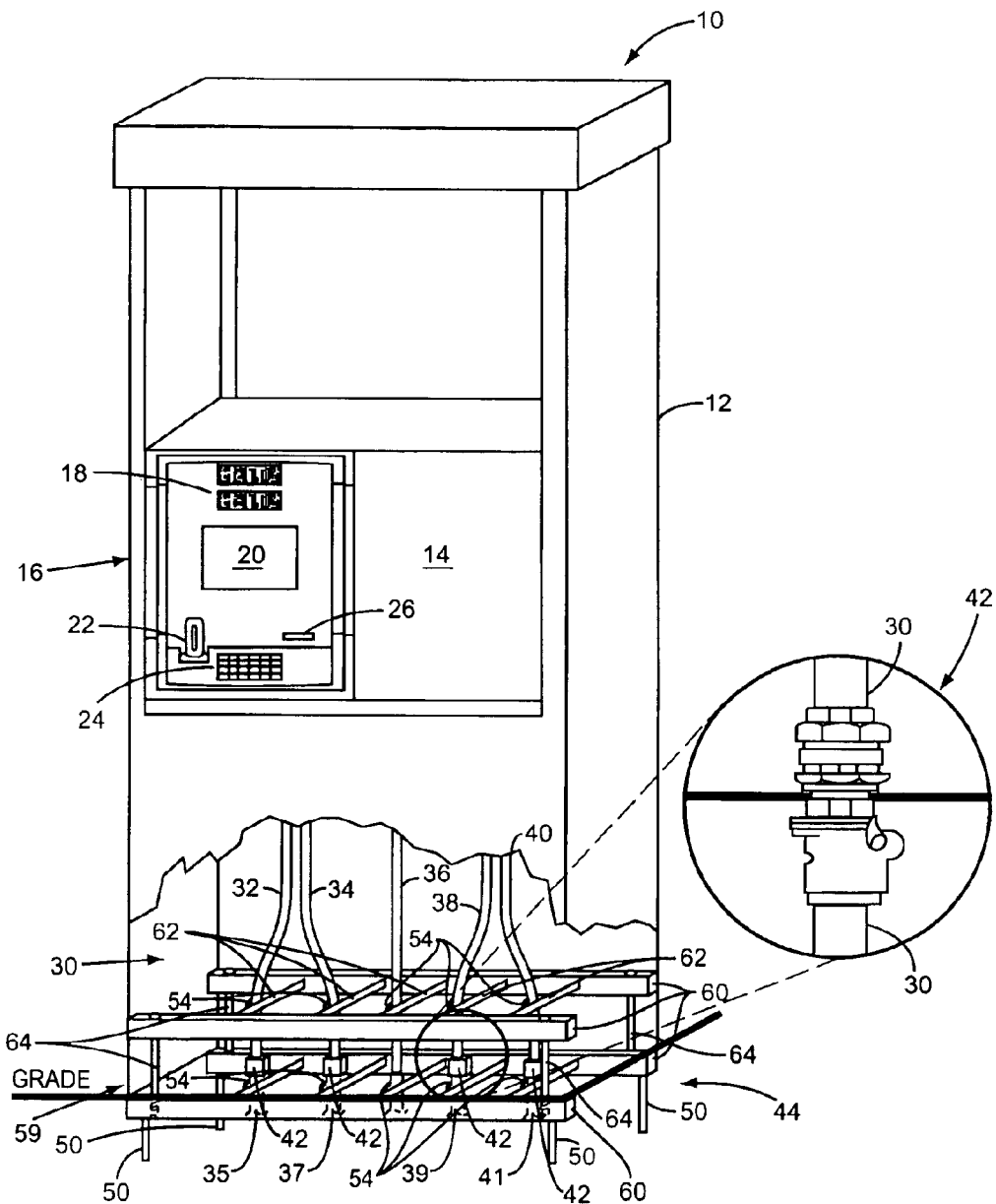
FIG. 9 illustrates a fuel dispenser and shear valve assembly according to an alternative embodiment of the present invention.

FIG. 9 illustrates another embodiment of a shear valve assembly according to the present invention. The embodiment illustrated in FIG. 9 is similar to that of FIG. 7; however, all or a portion of the shear valve assembly 59 is countersunk underneath the ground level into the footprint 44. This is to lower the overall height of the fuel dispenser 10 in case the height of the shear valve assembly 59 in combination with the fuel dispenser 10 is too high to either meet regulations or for aesthetic and/or operational purposes.

Figure 10:
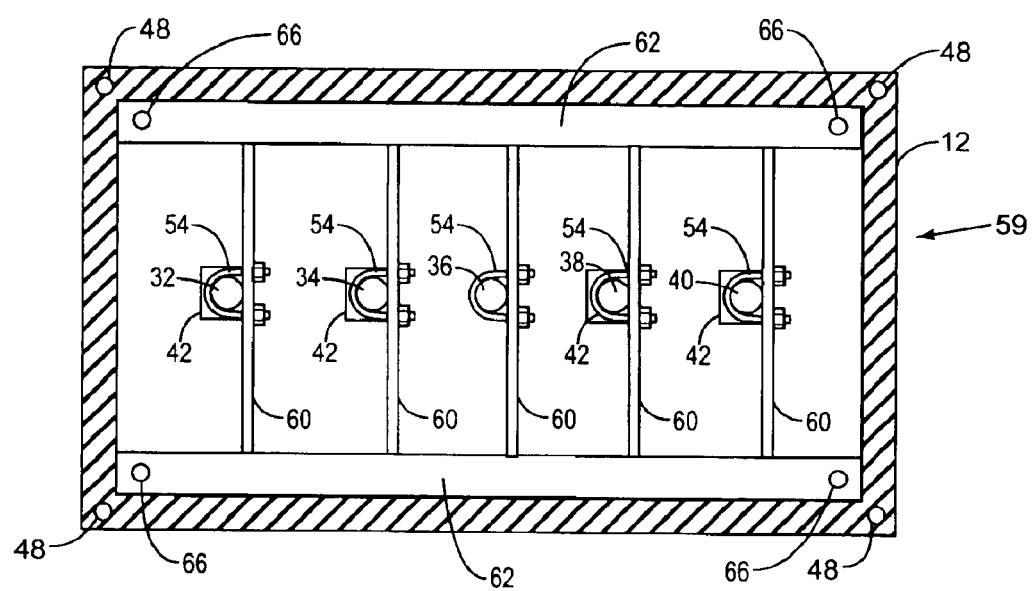
FIG. 10 illustrates a top view of FIG. 9.

FIG. 10 is a top view of the shear valve assembly 59 illustrated in FIG. 9, and appears exactly as the top view illustrated in FIG. 8 since the shear valve assembly 59 appears the same from the top view regardless of whether part or all of the shear valve assembly 59 is located beneath ground level.

Figure 11:
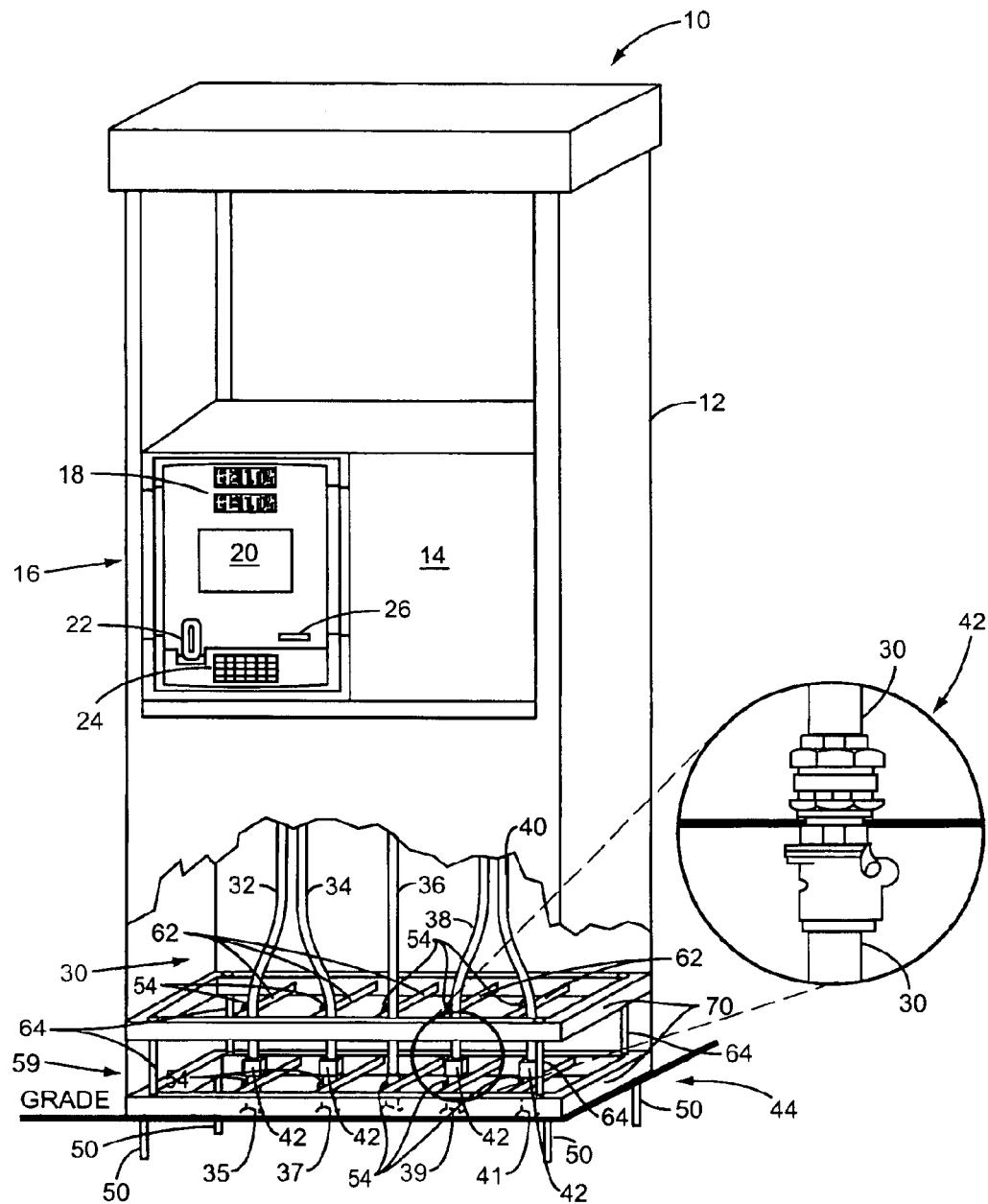
FIG. 11 illustrates a fuel dispenser and shear valve assembly according to an alternative embodiment of the present invention.

FIG. 11 illustrates another embodiment of a shear valve assembly according to the present invention. The embodiment illustrated in FIG. 11 is similar to that of FIG. 7; however, the shear valve assembly 59 is comprised of a substantially hollow closed structure 70 rather than parallel members 60. Two substantially hollow closed structures 70 are provided; one for locating at or above the plane of the shear valves 42, and the other at or beneath the plane of the shear valves 42. Just as in the embodiment illustrated in FIG. 7, the shear fasteners 64 attach the substantially hollow closed structures 70 to each other. The operation and characteristic aspects of the shear valve assembly 59 illustrated in FIG. 11 are similar to that illustrated in FIG. 7.

Figure 12:
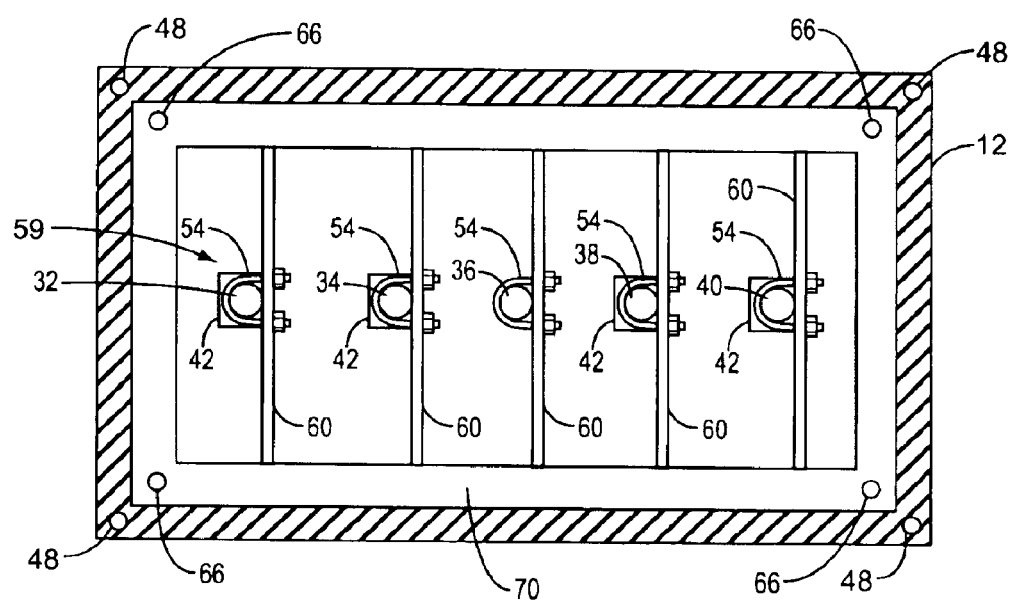
FIG. 12 illustrates a top view of FIG. 11.

FIG. 12 is a top view of the shear valve assembly 59 illustrated in FIG. 11.

Figure 13:
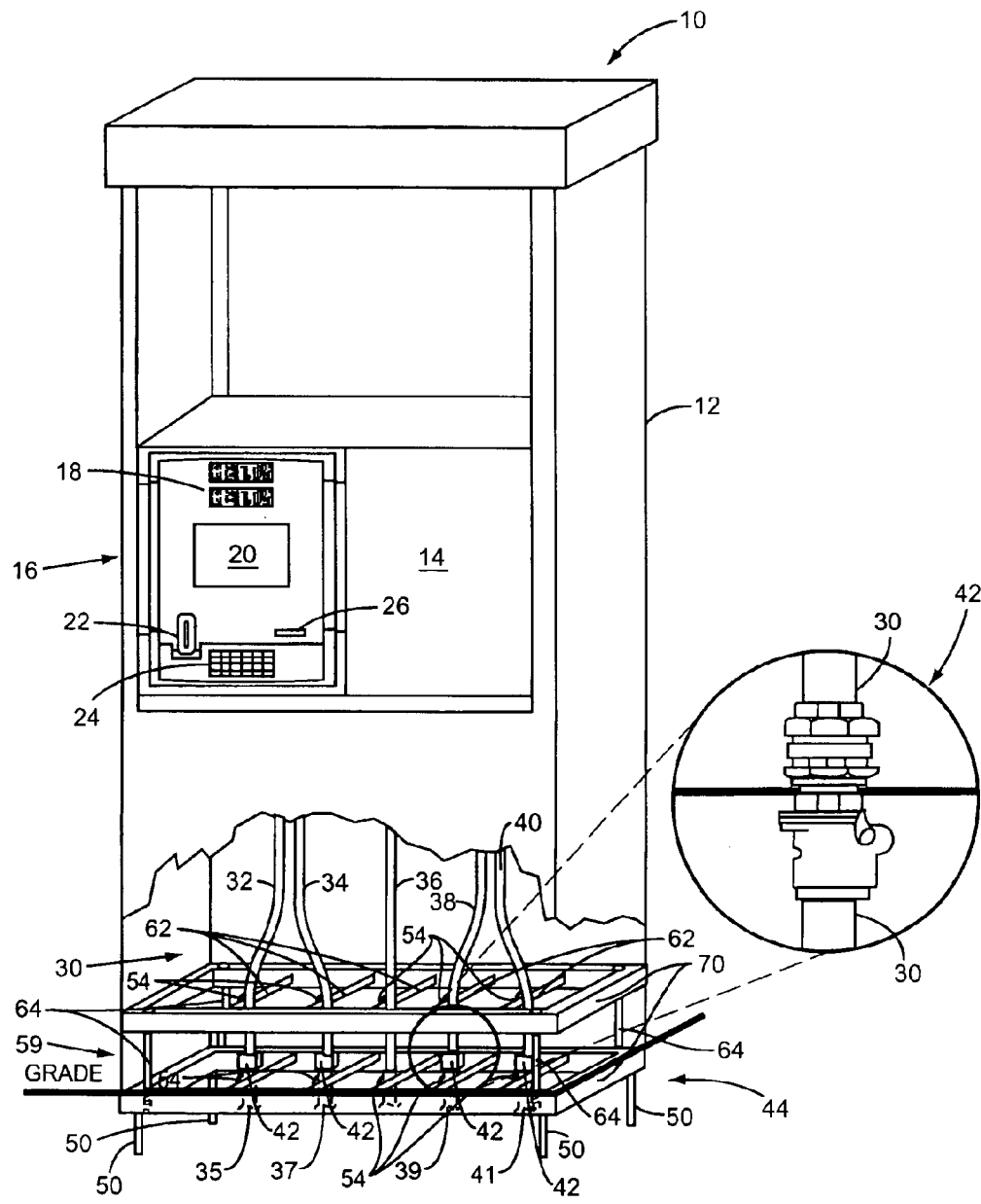
FIG. 13 illustrates a fuel dispenser and shear valve assembly according to an alternative embodiment of the present invention.

FIG. 13 illustrates another embodiment of a shear valve assembly according to the present invention. The embodiment illustrated in FIG. 13 is similar to that of FIG. 11; however, all or a portion of the shear valve assembly 59 is countersunk underneath the ground level into the footprint 44. This is to lower the overall height of the fuel dispenser 10 in case the height of the shear valve assembly 59 in combination with the fuel dispenser 10 is too high to either meet regulations or for aesthetic and/or operational purposes.

Figure 14:
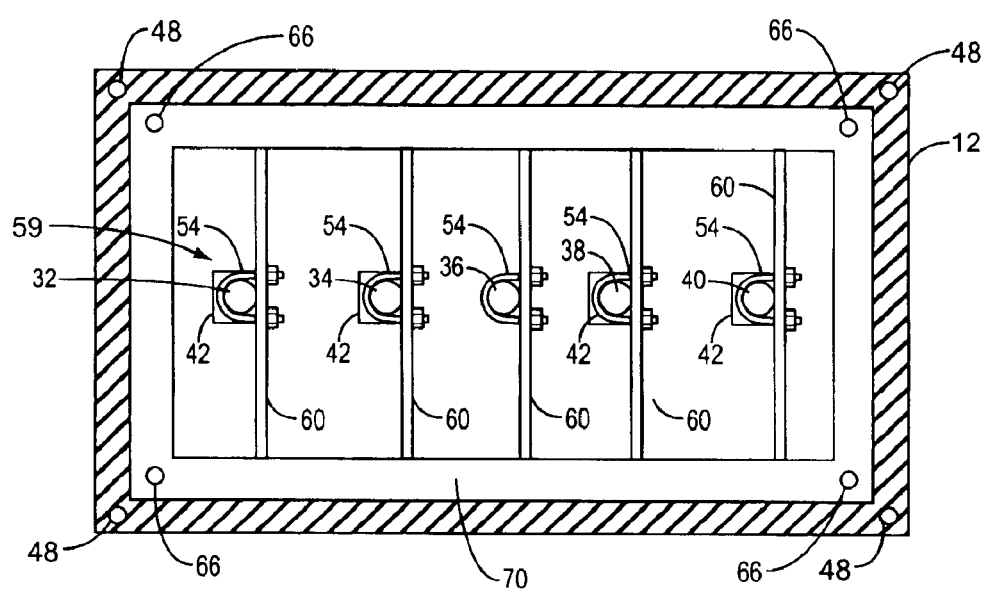
FIG. 14 illustrates a top view of FIG. 13.

FIG. 14 is a top view of the shear valve assembly 59 illustrated in FIG. 13, and appears exactly as the top view illustrated in FIG. 12 since the shear valve assembly 59 appears the same from the top view regardless of whether part or all of the shear valve assembly 59 is located beneath ground level.

Figure 15:
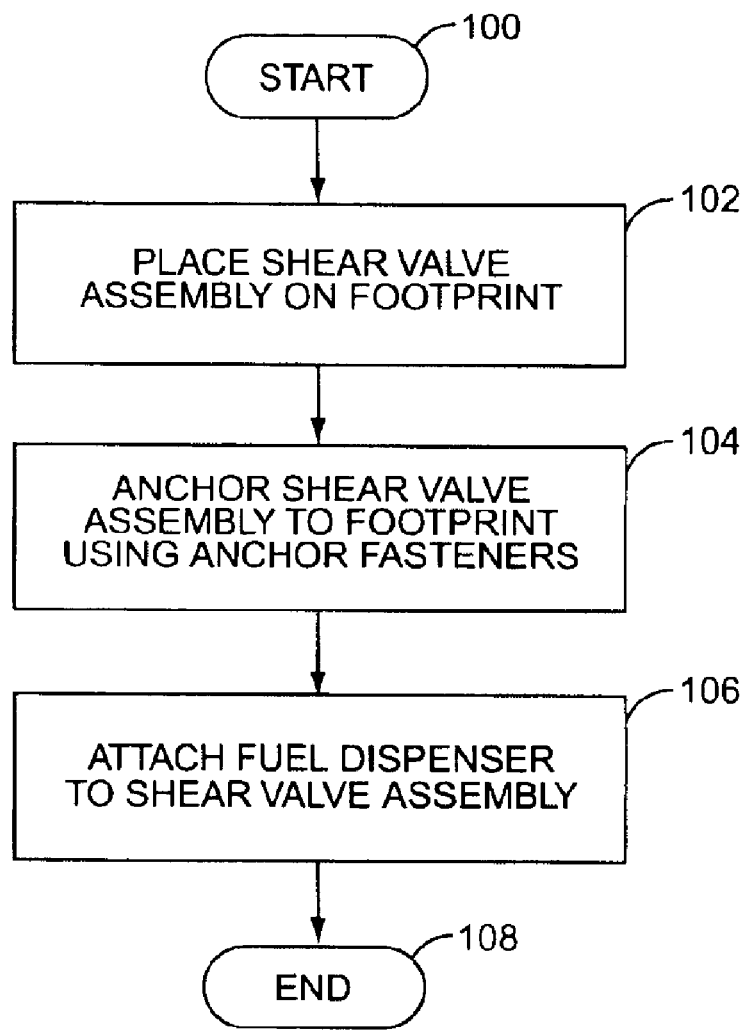
FIG. 15 illustrates a flowchart of the steps to install the shear valve assembly of the present invention.

FIG. 15 illustrates a flowchart of one embodiment of how the shear valve assembly 59 may be installed if the shear valve assembly 59 is not constructed as part of the fuel dispenser 10 during the manufacture of the fuel dispenser 10. The process starts (block 100), and the shear valve assembly 59 is placed on the footprint 44 (block 102). The shear valve assembly 59 is secured to the footprint 44 and/or the ground using anchor fasteners 50 inserted into the anchor fastener orifices 48 (block 104). The fuel dispenser 10 is attached to the shear valve assembly 59 (block 106), and the process ends (block 108).

Those skilled in the art will recognize improvements and modifications to the preferred embodiments of the present invention. All such improvements and modifications are considered within the scope of the concepts disclosed herein and the claims that follow.

What is claimed is:

1. A fuel dispenser for delivering fuel to a vehicle, comprising:
   a housing;
   a shear valve located in a horizontal plane and coupled in between a fuel supply conduit located internal to said housing and a branch conduit wherein said fuel supply conduit receives fuel from said branch conduit; and
   a shear valve assembly comprising at least two members connected to said housing wherein one of said members is located in a plane in or above the horizontal plane and wherein the other of said members is located in a plane in or below the horizontal plane, and wherein and at least one shear fastener connects said at least two members to each other such that said at least one shear fastener is also located in a plane that crosses the horizontal plant wherein the energy from an impact to said housing is directed into said shear fastener.

2. The fuel dispenser of claim 1, wherein said shear valve assembly contains at least one anchor fastener orifice in which to place an anchor fastener to secure said shear valve assembly to the ground.

3. The fuel dispenser of claim 2, wherein said at least one anchor fastener orifice is comprised of four anchor fastener orifices.

4. The fuel dispenser of claim 1, wherein one of said at least two members comprises a first substantially hollow structure and wherein the other of said at least two members comprises a second substantially hollow structure wherein said first substantially hollow structure.

5. The fuel dispenser of claim 4, further comprising a cross member wherein said cross member is attached from one side of said first substantially hollow structure to an opposite side of said first substantially hollow structure wherein said fuel supply conduit is secured to said cross member.

6. The fuel dispenser of claim 5, wherein said fuel supply conduit is secured to said cross member using a U-bolt.

7. The fuel dispenser of claim 4, further comprising a cross member wherein said cross member is attached from one side of said second substantially hollow structure to an opposite side of said second substantially hollow structure wherein said fuel supply conduit is secured to said cross member.

8. The fuel dispenser of claim 7, wherein said fuel supply conduit is secured to said cross member using a U-bolt.

9. The fuel dispenser of claim 1, wherein said shear fastener is comprised from the group consisting of a screw, a bolt, a rod, a shaft, a conduit, and a pipe.

10. The fuel dispenser of claim 1, further comprising a shear valve coupled inline to said fuel supply conduit.

11. The fuel dispenser of claim 1, wherein said at least two members is comprised of a first set of two parallel members connected using said at least one shear fastener to a second set of two parallel members located below said first set of parallel members.

12. The fuel dispenser of claim 11, wherein said first set of parallel members is secured to said housing.

13. The fuel dispenser of claim 11, wherein said second set of parallel members is secured to the ground using at least one anchor fastener.

14. The fuel dispenser of claim 12, further comprising a cross member that is attached from one of said first two parallel members to the opposite side of said first two parallel members wherein said fuel supply conduit is secured to said cross member.

15. The fuel dispenser of claim 14, wherein said fuel supply conduit is secured to said cross member using a U-bolt.

16. The fuel dispenser of claim 12, further comprising a cross member that is attached from one of said second two parallel members to the opposite side of said second two parallel members wherein said fuel supply conduit is secured to said cross member.

17. The fuel dispenser of claim 16, wherein said fuel supply conduit is secured to said cross member using a U-bolt.

18. A shear valve assembly that attaches to a fuel dispenser, comprising:
   a first substantially hollow structure that attaches to the fuel dispenser;
   a second substantially hollow structure containing at least one anchor fastener orifice that is adapted to receive an anchor fastener to attach said second substantially hollow structure to the ground; and
   at least one shear fastener that attaches said first substantially hollow structure to said second substantially hollow structure.

19. The assembly of claim 18, wherein said at least one anchor fastener orifice is comprised of four orifices.

20. The assembly of claim 18, wherein said at least one shear fastener is comprised from the group consisting of at least one screw, at least one bolt, at least one rod, at least one shaft, at least one conduit, and at least one pipe.

21. The assembly of claim 18, further comprising a cross member that is attached from one side of said first substantially hollow structure to an opposite side of said first substantially hollow structure.

22. The assembly of claim 21, further comprising a U-bolt that is attached to said cross member.

23. The assembly of claim 18, further comprising a cross member that is attached from one side of said second substantially hollow structure to an opposite side of said second substantially hollow structure.

24. The assembly of claim 23, further comprising a U-bolt that is attached to said cross member.

25. A shear valve assembly that attaches to a fuel dispenser, comprising:
   a first set of parallel members that attaches to the fuel dispenser;
   a second set of parallel members containing at least one anchor fastener orifice that is adapted to receive an anchor fastener to attach said second set of parallel members to the ground; and
   at least one shear fastener that attaches said first set of parallel members to said second set of parallel members.

26. The assembly of claim 25, wherein said at least one anchor fastener orifice is comprised of four orifices.

27. The assembly of claim 25, wherein said at left one shear fastener is comprised from the group consisting of at least one screw, at least one bolt, at least one rod, at least one shaft, at least one conduit, and at least one pipe.

28. The assembly of claim 25, further comprising a cross member that is attached from one side of said first set of parallel members to an apposite side of said first set of parallel members.

29. The assembly of claim 28, further comprising a U-bolt that is attached to said cross member.

30. The assembly of claim 25, further comprising a cross member that is attached from one side of said second set of parallel members to an apposite side of said second set of parallel members.

31. The assembly of claim 30, further comprising a U-bolt that is attached to said cross member.

32. A method of installing a shear valve assembly to a fuel dispenser during manufacture, comprising the steps of:
   attaching a first substantially hollow structure of a shear valve assembly to a fuel dispenser;
   attaching a second substantially hollow structure to the ground; and
   attaching said first substantially hollow structure to said second substantially hollow structure using a shear fastener.

33. A method of installing a shear valve assembly to a fuel dispenser during manufacture, comprising the steps of:
   attaching a first set of parallel members of a shear valve assembly to a fuel dispenser;
   attaching a second set of parallel members to the ground; and
   attaching said first set of parallel members to said second set of parallel members using a shear fastener.

34. A fuel dispenser for delivering fuel to a vehicle, comprising:
   a housing;
   a shear valve coupled in between a fuel supply conduit and a branch conduit wherein said fuel supply conduit receives fuel from a said branch conduit; and
   a shear valve assembly connected to said housing and including at least one shear fastener located in the horizontal plane of said shear valve wherein the energy from an impact to said housing is directed into said shear fastener;
   wherein said shear valve assembly is comprised of a first substantially hollow structure connected by said at least one shear fastener to a second substantially hollow structure located below said first substantially hollow structure.

35. The fuel dispenser of claim 34, further comprising a cross member wherein said cross member is attached from one side of said first substantially hollow structure to an opposite side of said first substantially hollow structure wherein said fuel supply conduit is secured to said cross member.

36. The fuel dispenser of claim 35, wherein said fuel supply conduit is secured to said cross member using a U-bolt.

37. The fuel dispenser of claim 34, further comprising a cross member wherein said cross member is attached from one side of said second substantially hollow structure to an opposite side of said second substantially hollow structure wherein said fuel supply conduit is secured to said cross member.

38. The fuel dispenser of claim 37, wherein said fuel supply conduit is secured to said cross member using a U-bolt.

39. A fuel dispenser for delivering fuel to a vehicle, comprising:

a housing;

a shear valve coupled in between a fuel supply conduit and a branch conduit wherein said fuel supply conduit receives fuel from a said branch conduit; and a shear valve assembly connected to said housing and including at least one shear fastener located in the horizontal plane of said shear valve wherein the energy from an impact to said housing is directed into said shear fastener;

wherein said shear valve assembly is comprised of a first set of two parallel members connected using at least one shear fastener to a second set of two parallel members located below said first set of parallel members.

40. The fuel dispenser of claim 39, wherein said first set of parallel members is secured to said housing.

41. The fuel dispenser of claim 39, wherein said second set of parallel members is secured least one anchor fastener.

42. The fuel dispenser of claim 40, further comprising a cross member that is attached from one of said first two parallel members to the opposite side of said first two parallel members wherein said fuel supply conduit is secured to said cross member.

43. The fuel dispenser of claim 42, wherein said fuel supply conduit is secured to said cross member using a U-bolt.

44. The fuel dispenser of claim 40, further comprising a cross member that is attached from one of said second two parallel members to the opposite side of said second two parallel members wherein said fuel supply conduit is secured to said cross member.

45. The fuel dispenser of claim 44, wherein said fuel supply conduit is secured to said cross member using a U-bolt.

46. A method of installing a shear valve assembly to a fuel dispenser during manufacture, comprising the steps of:

attaching a first member of a shear valve assembly to a fuel dispenser;

attaching a second member of said shear valve assembly to the ground; and attaching said first member to said second member using a shear fastener.

* * * * *

UNITED STATES PATENT AND TRADEMARK OFFICE
CERTIFICATE OF CORRECTION

PATENT NO. : 6,913,046 B2
DATED : July 5, 2005
INVENTOR(S) : Ray J. Hutchinson and John S. McSpadden It is certified that error appears in the above-identified patent and that said Letters Patent is hereby corrected as shown below:

Column 8,
Lines 42-43, remove "wherein said first substantially hollow structure".

Column 10,
Line 5, change "apposite" to -- opposite --.
Line 11, change "apposite" to -- opposite --.
Line 39, change "from a said" to -- from said --.

Column 11,
Line 6, "from a said" to -- from said --.
Line 21, insert -- to the ground using -- after "secured".

Signed and Sealed this

Thirtieth Day of August, 2005

JON W. DUDAS
*Director of the United States Patent and Trademark Office*